United States Patent
Sugita

(10) Patent No.: US 10,648,508 B2
(45) Date of Patent: May 12, 2020

(54) RETAINER AND ROLLING BEARING WITH SAME

(71) Applicant: NSK LTD., Tokyo (JP)

(72) Inventor: Yoshifumi Sugita, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/344,504

(22) PCT Filed: Nov. 1, 2017

(86) PCT No.: PCT/JP2017/039638
§ 371 (c)(1),
(2) Date: Apr. 24, 2019

(87) PCT Pub. No.: WO2018/084219
PCT Pub. Date: May 11, 2018

(65) Prior Publication Data
US 2019/0249717 A1   Aug. 15, 2019

(30) Foreign Application Priority Data

Nov. 4, 2016   (JP) .................................. 2016-216734
May 8, 2017   (JP) .................................. 2017-092524

(51) Int. Cl.
*F16C 33/38* (2006.01)
*F16C 33/66* (2006.01)
(Continued)

(52) U.S. Cl.
CPC .......... *F16C 33/3806* (2013.01); *F16C 19/16* (2013.01); *F16C 19/26* (2013.01);
(Continued)

(58) Field of Classification Search
CPC .............. F16C 33/3806; F16C 33/3837; F16C 33/3843; F16C 33/385; F16C 33/3856;
(Continued)

(56) References Cited

U.S. PATENT DOCUMENTS 10,422,381 B2 * 9/2019 Sugita .................... F16C 19/16
2009/0060407 A1 * 3/2009 Tachi .................. F16C 33/3806
384/533

(Continued)

FOREIGN PATENT DOCUMENTS

CN   201606409 U   10/2010
CN   103790965 A   5/2014
(Continued)

OTHER PUBLICATIONS

Machine translation of JP-2005090658-A (Year: 2005).*
(Continued)

*Primary Examiner* — Alan B Waits
(74) *Attorney, Agent, or Firm* — Sughrue Mion, PLLC

(57) ABSTRACT

A retainer of an outer ring guide type, includes a retainer guide surface, a relief surface (edge relief groove), and an axial groove. The retainer guide surface is provided on at least one axial end portion of a retainer outer diameter surface and is guided by the outer ring. The relief surface is formed on the retainer outer diameter surface along a circumferential direction, located on an axial center side with respect to the retainer guide surface, and has an outer diameter smaller than that of the retainer guide surface. The axial groove extends from the pockets to an axial end on the retainer outer diameter surface, forms an axial step portion by axially traversing the retainer guide surface, and has a groove bottom on a radial inner side with respect to the relief surface.

7 Claims, 21 Drawing Sheets

(51) Int. Cl.
  *F16C 19/26* (2006.01)
  *F16C 19/16* (2006.01)
  *F16C 33/46* (2006.01)

(52) U.S. Cl.
  CPC .......... *F16C 33/3843* (2013.01); *F16C 33/66* (2013.01); *F16C 33/6614* (2013.01); *F16C 33/6629* (2013.01); *F16C 19/163* (2013.01); *F16C 33/4605* (2013.01); *F16C 33/4676* (2013.01)

(58) Field of Classification Search
  CPC .. F16C 33/66; F16C 33/6629; F16C 33/6651; F16C 33/6681; F16C 33/6614; F16C 19/16; F16C 19/163; F16C 19/26; F16C 33/4604; F16C 33/4767
  See application file for complete search history.

(56) References Cited

U.S. PATENT DOCUMENTS

2013/0071056 A1  3/2013  Sugita
2013/0087413 A1  4/2013  Carter et al.

FOREIGN PATENT DOCUMENTS

| CN | 105736579 A |   | 7/2016 |            |
|----|-------------|---|--------|------------|
| EP | 2 865 910 A1 |  | 4/2015 |            |
| JP | 11-315840 A |   | 11/1999 |           |
| JP | 2005-90657 A |  | 4/2005 |            |
| JP | 2005090658 A | * | 4/2005 | .......... F16C 33/6681 |
| JP | 2009-58039 A |  | 3/2009 |            |
| JP | 2011-196513 A | | 10/2011 |           |
| JP | 2013-7419 A |   | 1/2013 |            |
| JP | 2014-95469 A |  | 5/2014 |            |
| JP | 2014-534388 A | | 12/2014 |           |

OTHER PUBLICATIONS

Communication dated Sep. 4, 2019, issued by the European Patent Office in counterpart European Application No. 17866517.0.
Search Report dated Jan. 30, 2018, issued by the International Searching Authority in counterpart International Patent Application No. PCT/JP2017/039638 (PCT/ISA/210).
Written Opinion dated Jan. 30, 2018, issued by the International Searching Authority in counterpart International Patent Application No. PCT/JP2017/039638 (PCT/ISA/237).
Communication dated Jan. 14, 2020 issued by the State Intellectual Property Office of P.R. China in counterpart Chinese Application No. 201780067545.6.

* cited by examiner

FIG.21

| | | COMPARATIVE EXAMPLE 1 | EXAMPLE 1 | COMPARATIVE EXAMPLE 2 | COMPARATIVE EXAMPLE 3 |
|---|---|---|---|---|---|
| MATERIAL | | PPS-CF | PPS-CF | PPS-CF | PPS-CF |
| EDGE RELIEF GROOVE | PRESENCE | NO | YES | YES | YES |
| | DEPTH | — | 0.1mm | 0.5mm | 0.5mm |
| | WIDTH | — | 9.3mm (=POCKET DIAMETER) | 9.3mm (=POCKET DIAMETER) | 13mm (>POCKET DIAMETER) |
| AXIAL GROOVE | PRESENCE | YES | YES | YES | YES |
| | DEPTH | 0.5mm | 0.5mm | 0.5mm | 0.5mm |
| SHAPES AND POSITIONAL RELATIONSHIP OF RETAINER AND BEARING OUTER RING | | | | | |
| GREASE ADHERED POSITION IN RETAINER OUTER DIAMETER AFTER TEST (HATCH PORTION) | | | | | |
| DISCHARGE PROPERTY OF GREASE FROM GUIDE SURFACE | | ○ | ○ | △ | × |
| WEAR RESISTANCE OF RETAINER OUTER DIAMETER | | × EDGE WEAR | ○ | △ LUBRICATION FAILURE | × LUBRICATION FAILURE |

RETAINER AND ROLLING BEARING WITH SAME

TECHNICAL FIELD

The present invention relates to a retainer and a rolling bearing including the retainer.

BACKGROUND ART

Generally, a rolling bearing such as a cylindrical roller bearing or an angular contact ball bearing is used as a main shaft bearing of a machine tool. A plastic retainer formed of a synthetic resin is used as a retainer of these rolling bearings. The plastic retainer is lightweight, and accordingly a centrifugal force during rotation is small, which is advantageous for high-speed rotation.

As a lubrication method of such a rolling bearing, grease lubrication, oil air lubrication, jet lubrication, and the like are selected as appropriate, and generally, grease enclosing lubrication by initial enclosing is widely used due to low cost and easy maintenance (see, for example, Patent Document 1).

In a rolling bearing including a retainer of an outer ring guide type, an axial groove may be provided on a retainer outer diameter surface serving as a guide surface, so as to discharge excess grease in vicinity of a rolling contact portion. When a groove is provided on the retainer outer diameter surface in an axial direction, grease is scraped out in vicinity of a step portion of the groove. On the other hand, when no axial groove is provided in the retainer outer diameter surface, grease is sheared and discharged from the guide surface by rotation of the retainer when entering a place between the retainer and an outer ring inner diameter surface, since a guide gap formed between the outer ring inner diameter surface and the retainer outer diameter surface is constant.

PRIOR ART DOCUMENT

Patent Document

Patent Document 1: JP-A-2014-95469

SUMMARY OF THE INVENTION

Problems to be Solved by the Invention

In an angular contact ball bearing of an outer ring guide type, a raceway surface edge that can be an intersection of an outer ring raceway surface and an outer ring guide surface is in contact with a retainer. Accordingly, the retainer is more likely to wear as compared with other contact parts. Particularly, in a resin retainer formed by injection molding, an amorphous layer on a surface thereof wears, and an entire retainer guide surface wears prematurely therefrom. A metal retainer is also likely to wear, and an overall performance of the bearing decreases since abrasion powder is generated and a lubrication state deteriorates. In order to prevent such wear, an edge relief groove may be provided circumferentially around a retainer outer diameter surface.

However, in order to move grease to an axial outer side of the retainer through the retainer guide surface, the above shearing due to contact of grease with the retainer guide surface and the outer ring guide surface or the above scraping due to a step portion of an axial groove is necessary. When an edge relief groove or the like is formed in the retainer outer diameter surface, a force for discharging grease accumulated in a position of the outer ring guide surface that faces the edge relief groove may not work. Grease again adheres to rolling elements, circulates in the bearing, and returns to the retainer inner diameter surface. Such behavior of grease increases stirring resistance and an amount of heat generation in general, which may lead to a decrease in bearing life or bearing seizure. This is particularly remarkable for a main shaft bearing of a machine tool that is used with grease lubrication and a dmn value of 800,000 (PCD (ball pitch circle diameter)×rotational speed) or more.

Therefore, an object of the present invention is to provide a retainer capable of reducing an amount of heat generated by stirring resistance of grease and preventing a decrease in life of a rolling bearing, and a rolling bearing including the retainer.

Means for Solving the Problems

The present invention has following configurations.

(1) There is provided a retainer of an outer ring guide type, applied to a rolling bearing including an inner ring, an outer ring, and a plurality of rolling elements disposed between the outer ring and the inner ring, and has a plurality of pockets in which the rolling elements are held. The retainer includes:

a retainer guide surface that is provided on at least one axial end portion of a retainer outer diameter surface of the retainer and is guided by the outer ring;

a relief surface that is formed on the retainer outer diameter surface along a circumferential direction, located on an axial center side with respect to the retainer guide surface, and has an outer diameter smaller than that of the retainer guide surface; and an axial groove that extends from the pockets to an axial end on the retainer outer diameter surface, forms an axial step portion by axially traversing the retainer guide surface, and has a groove bottom on a radial inner side with respect to the relief surface.

According to the retainer in this configuration, grease moved from a pocket on the retainer outer diameter surface to a retainer outer diameter side enters the axial groove. Grease having entered the axial groove is deposited on an upstream side in a rotation direction between the axial groove and the axial step portion, and is pressed to the axial step portion. Accordingly, grease moves axially outside. Further, grease adhering to the relief surface from the pocket moves in the circumferential direction and enters the axial groove that is formed on a radial inner side with respect to the relief surface, and abuts on the axial step portion to be deposited. The deposited grease merges with a flow of grease described above, flows to be discharged axially outside from the one axial end portion by the axial step portion, and flows to adhere to the rolling elements, return to the retainer inner diameter portion, and circulate inside the bearing. Accordingly, it is possible to reduce stirring resistance due to grease, and to prevent an increase in an amount of heat generation.

(2) In the retainer according to (1), a circumferential step portion formed by the relief surface by circumferentially traversing the retainer guide surface is disposed on the one axial end portion side with respect to an axial position at which the axial step portion is connected to the pockets.

According to the retainer in this configuration, a grease inlet is widened, through which grease adhering to the relief groove enters the axial groove from a gap between the retainer guide surface and the rolling elements, so that grease on the relief surface can enter the axial groove more smoothly.

(3) In the retainer according to (2), the circumferential step portion is disposed on an axial center side with respect to a pocket end portion of the pockets on the one axial end portion side.

According to the retainer in this configuration, grease moved from a pocket to a retainer outer diameter side enters the axial groove easily. As a result, grease is prevented from moving along the circumferential direction only on the relief surface.

(4) In the retainer according to any one of (1) to (3), when an outer diameter of the retainer guide surface is D1, and an outer diameter of the relief surface is D2, the retainer satisfies:

$$D1 \times 0.999 \geq D2.$$

According to the retainer in this configuration, an appropriate gap is provided between the rolling elements and the outer ring guide surface, and a smooth flow of grease can be obtained.

(5) In the retainer according to any one of (1) to (4), the retainer guide surface is provided on the one axial end portion and another axial end portion that is opposite to the one axial end portion.

According to the retainer in this configuration, the retainer can be assembled into the bearing without considering an orientation of the retainer, and assembling workability of the retainer can be improved.

(6) There is provided a rolling bearing including the retainer according to any one of (1) to (5).

According to the rolling bearing in this configuration, an amount of heat generated by stirring resistance of can be reduced, and a decrease in life can be prevented.

(7) The rolling bearing according to (6) is an angular contact ball bearing.

According to the rolling bearing in this configuration, grease can be smoothly discharged with an anti-counterbore side serving as the guide surface.

According to the present invention, an amount of heat generated by stirring resistance of can be reduced, and a decrease in life of the rolling bearing can be prevented.

BRIEF DESCRIPTION OF DRAWINGS

FIG. 21 is an explanatory diagram showing retainers and test results obtained by testing a discharge property of grease and wearing resistance of the retainers.

DESCRIPTION OF EMBODIMENTS

Hereinafter, an embodiment of the present invention will be described in detail with reference to the drawings.

First Configuration Example

Figure 1:
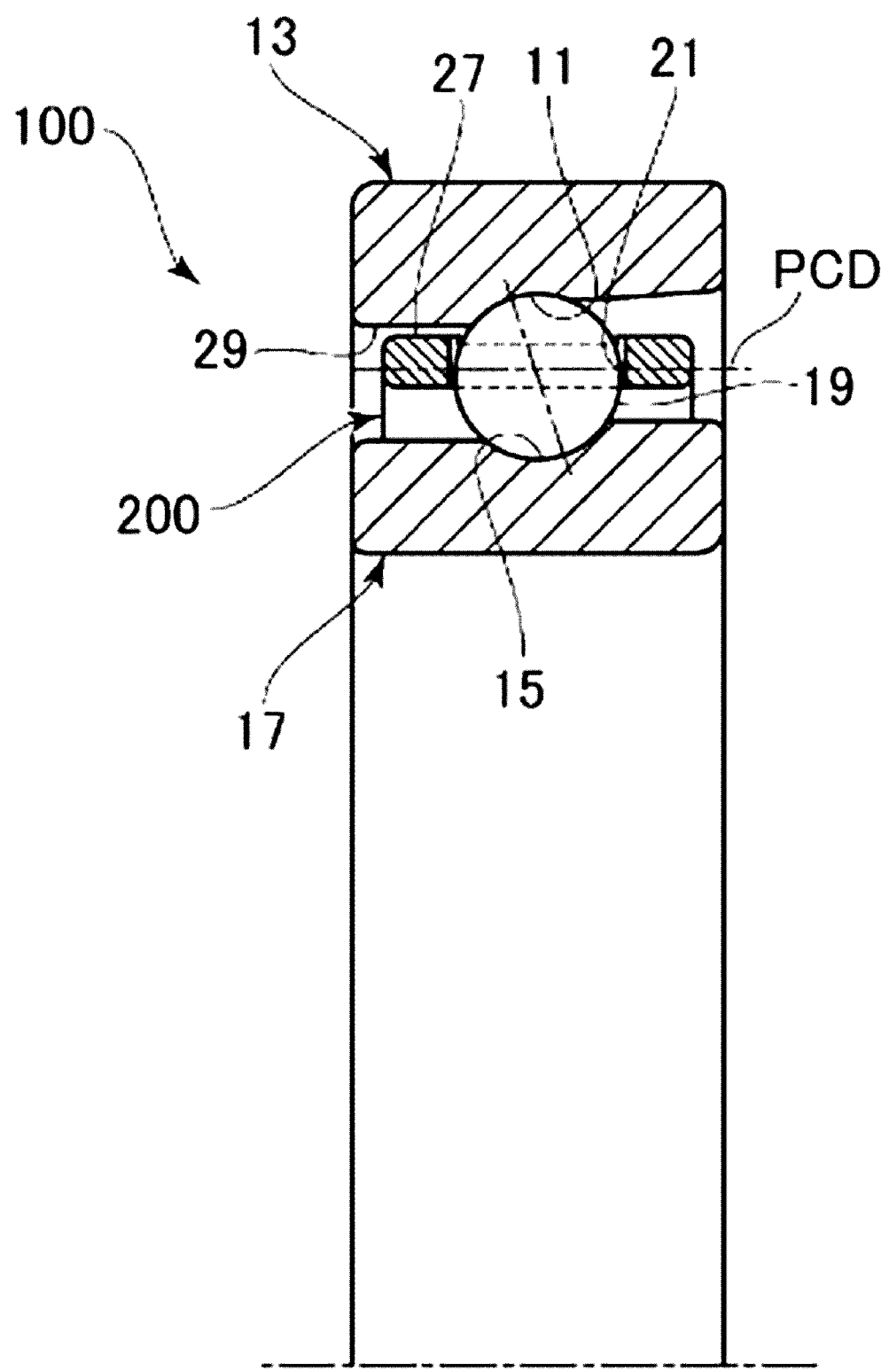
FIG. 1 illustrates an embodiment of the present invention, and is a cross-sectional view of a part of a rolling bearing including a retainer according to a first configuration example.

FIG. 1 illustrates the embodiment of the present invention, and is a cross-sectional view of a part of a rolling bearing including a retainer. Here, an angular contact ball bearing used in a high-speed rotation device such as a main shaft of a machine tool is used as the rolling bearing. However, the present invention is not limited thereto, and a rolling bearing having another configuration may be used.

An angular contact ball bearing 100 includes an outer ring 13 having an outer ring raceway surface 11 on an inner peripheral surface, an inner ring 17 having an inner ring raceway surface 15 on an outer peripheral surface, a plurality of balls (rolling elements) 19, and a retainer 200 having a plurality of pockets 21.

Figure 2:
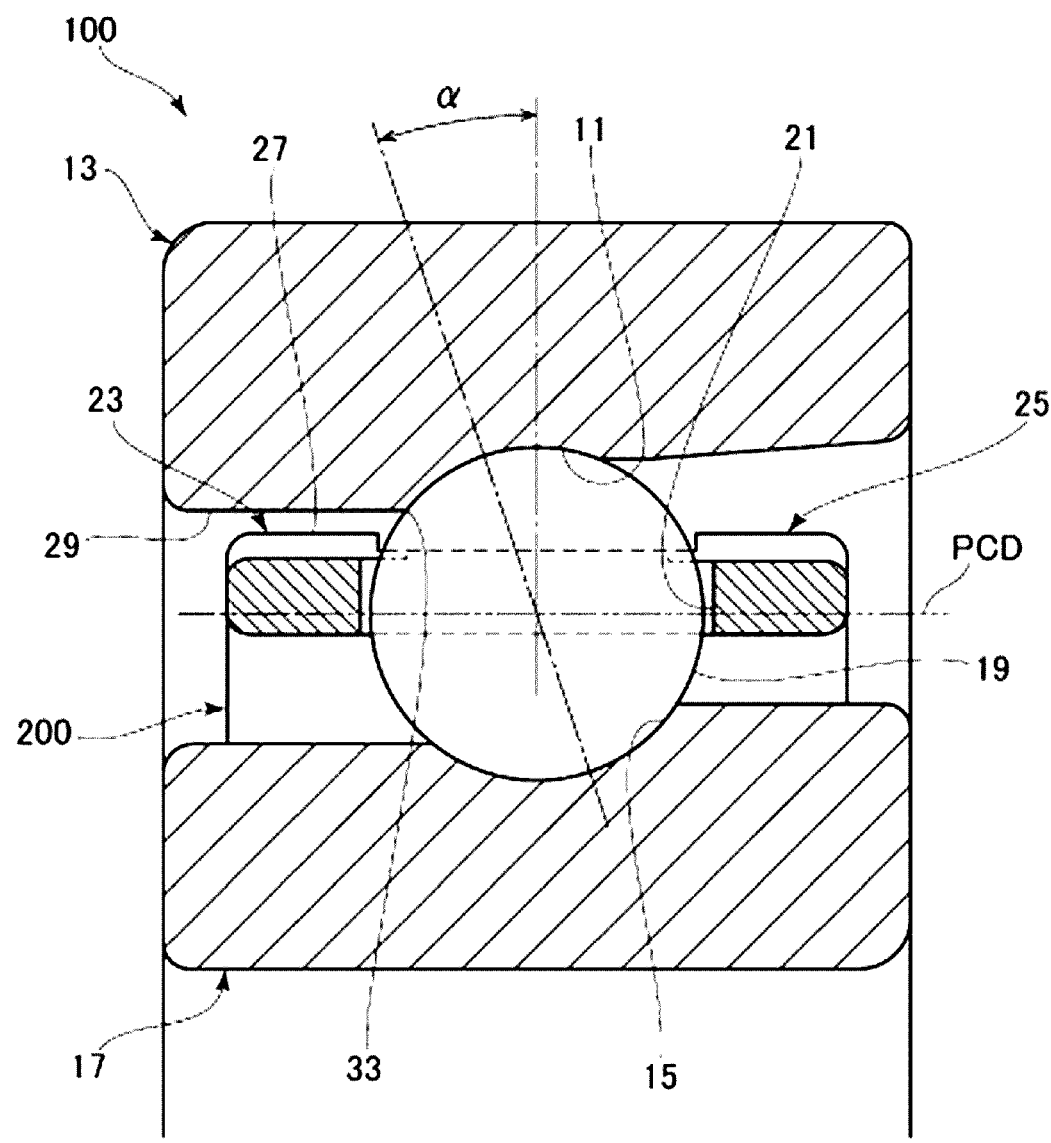
FIG. 2 is an enlarged cross-sectional view of a main part in FIG. 1.

FIG. 2 is an enlarged cross-sectional view of a main part in FIG. 1.

The plurality of balls 19 are rotatably disposed between the outer ring raceway surface 11 and the inner ring raceway surface 15 at a contact angle α. The retainer 200 is disposed between the inner ring 17 and the outer ring 13, and the plurality of pockets 21 are formed on a retainer outer diameter surface at intervals in a circumferential direction. The balls 19 are rotatably held in the pockets 21 respectively.

The retainer 200 is formed with annular guided portions 23, 25 protruding radially outward on both axial ends of the retainer outer diameter surface. The guided portions 23, 25 are respectively disposed at an equal interval along the circumferential direction (see FIG. 3), and both are disposed at the same circumferential position. Here, the guided portions 23, 25 mean guide surfaces on the retainer 200 side that are guided by an outer ring guide surface 29.

The angular contact ball bearing 100 in this configuration is an outer ring guide type in which a retainer guide surface 27 of the guided portion 23 on one axial end side (left side in FIG. 2) of the retainer 200 is guided in sliding contact with the outer ring guide surface 29 on an anti-counterbore side of the outer ring 13. In this configuration, since the bearing is an angular contact type bearing, only the guided portion 23 on one side of the retainer 200 is actually guided by the outer ring 13. However, the retainer 200 in the illustrated example has an axially symmetrical shape, and the guided portions 23, 25 are equivalent to each other. Accordingly, both guided portions 23, 25 are referred to as "guided portion".

The retainer 200 is an injection-molded product using a material containing a synthetic resin. Examples of the synthetic resin usable for the retainer 200 include polyphenylene sulfide (PPS) and carbon fiber reinforced polyphenylene sulfide (PPS-CF). In addition, polyamide (PA), polyamide-imide (PAI), thermoplastic polyimide, polyether ether ketone (PEEK) can be used as a base material, and organic fibers such as carbon fibers, glass fibers, and aramid fibers can be used as reinforcing fibers.

Figure 3:
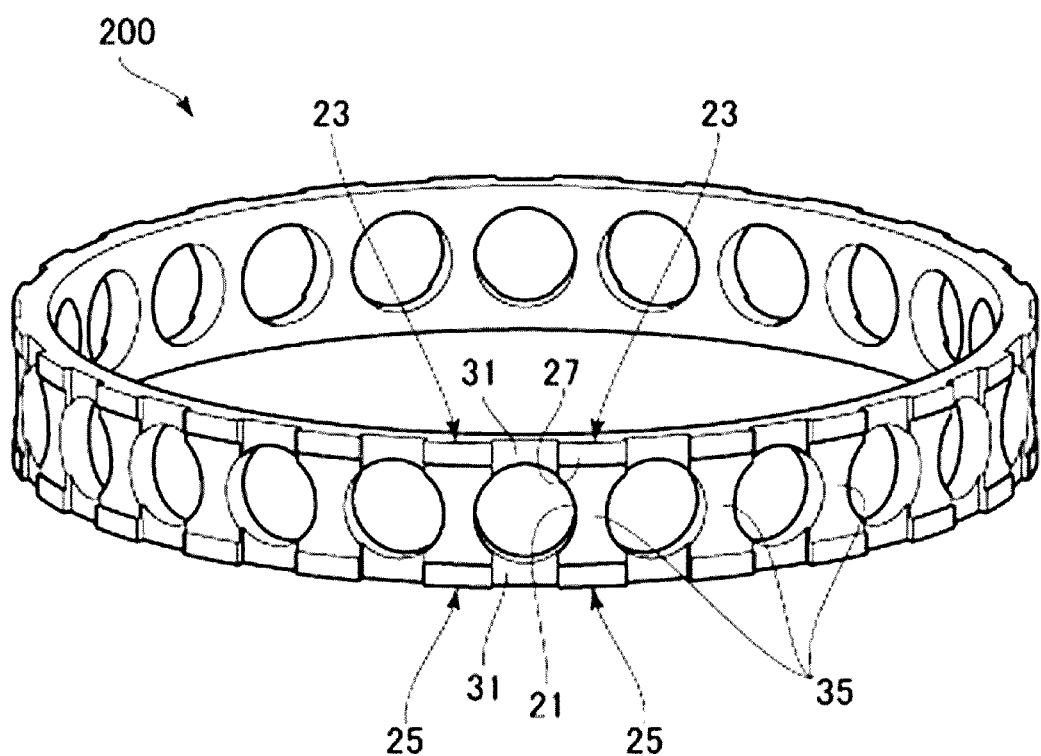
FIG. 3 is an external perspective view of an entire retainer illustrated in FIG. 2.

FIG. 3 is an external perspective view of an entire retainer illustrated in FIG. 2.

An axial groove 31 having a radial height smaller than that of the retainer guide surface 27 is formed between adjacent guided portions 23 in the circumferential direction and between adjacent guided portions 25 in the circumferential direction. The axial groove 31 functions as a discharge groove of a lubricant, as will be described below.

In this configuration, the axial groove 31 formed between adjacent guided portions 23 in the circumferential direction is necessary, and the axial groove 31 formed between adjacent guided portions 25 in the circumferential direction may be omitted together with the guided portion 25 as in a configuration example described below.

Figure 4A:
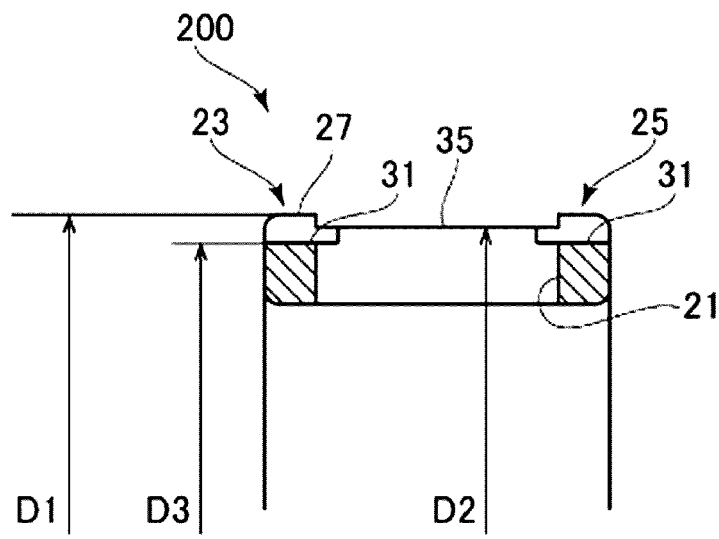
FIG. 4A is a cross-sectional view of the retainer illustrated in FIG. 3.
Figure 4B:
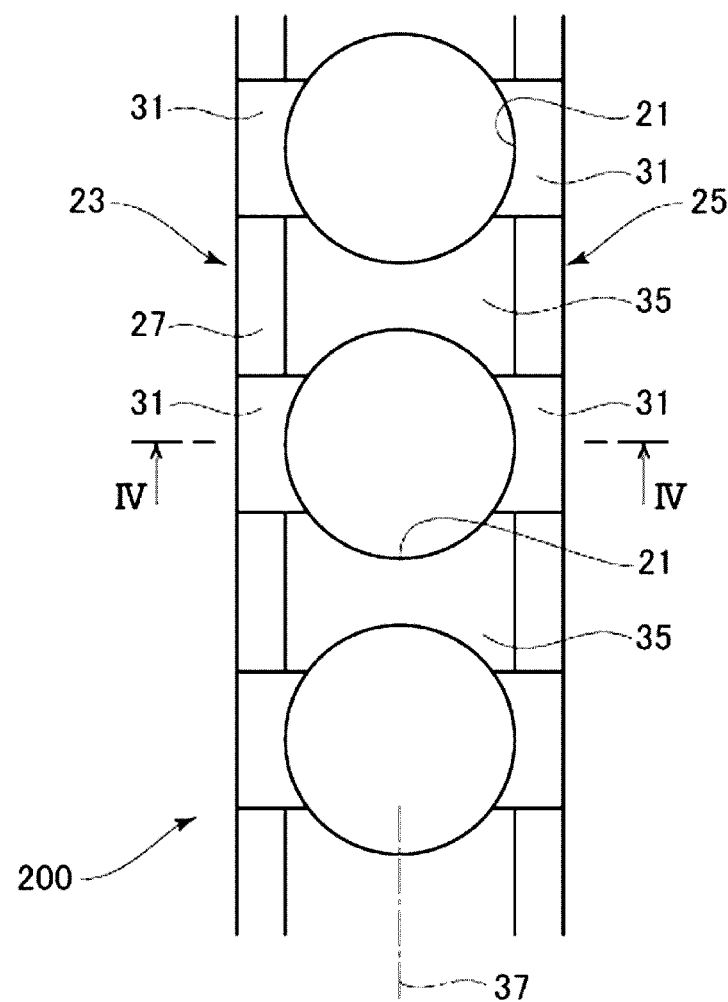
FIG. 4B is a front view of a main part of the retainer illustrated in FIG. 4A.

FIG. 4A is a cross-sectional view of the retainer illustrated in FIG. 3, and FIG. 4B is a front view of a main part of the retainer illustrated in FIG. 3. FIG. 4A is a cross-sectional view taken along line IV-IV in FIG. 4B.

Generally, the retainer disposed in the bearing is movable in a range of a guide gap between the retainer guide surface 27 and the outer ring guide surface 29 (see FIG. 2) and a pocket gap. Therefore, in the angular contact ball bearing of an outer ring guide type, the retainer guide surface 27 may come into contact with a raceway surface edge 33 (see FIG. 2) at a boundary between the outer ring guide surface 29 and the outer ring raceway surface 11 of the outer ring 13. When coming into contact with the raceway surface edge 33, the retainer guide surface 27 wears from a part in contact with the raceway surface edge 33. Therefore, the retainer 200 in this configuration is provided with a relief surface (edge relief groove 35 in this configuration example) recessed radially inward in a region facing the raceway surface edge 33 of the outer ring 13, so as not to come into contact with the raceway surface edge 33.

The edge relief groove 35 is formed in the retainer outer diameter surface in the circumferential direction, and is on an axial center side with respect to the retainer guide surface 27. The edge relief groove 35 has an outer diameter smaller than that of the retainer guide surface 27 and is formed in an annular shape. The edge relief groove 35 corresponds to an axial region between the guided portion 23 and the guided portion 25, and is lower than the retainer guide surface 27 in the radial direction. With this step, the raceway surface edge 33 does not come into contact with the retainer 200 even when the retainer 200 is inclined, and wear of the retainer 200 due to contact with the raceway surface edge 33 can be prevented in advance. In this configuration, the retainer 200 has a bilaterally symmetrical shape in FIG. 4B with respect to an imaginary line 37 that bisects the edge relief groove 35 in a groove width direction (left-right direction in FIG. 4B).

Figure 5:
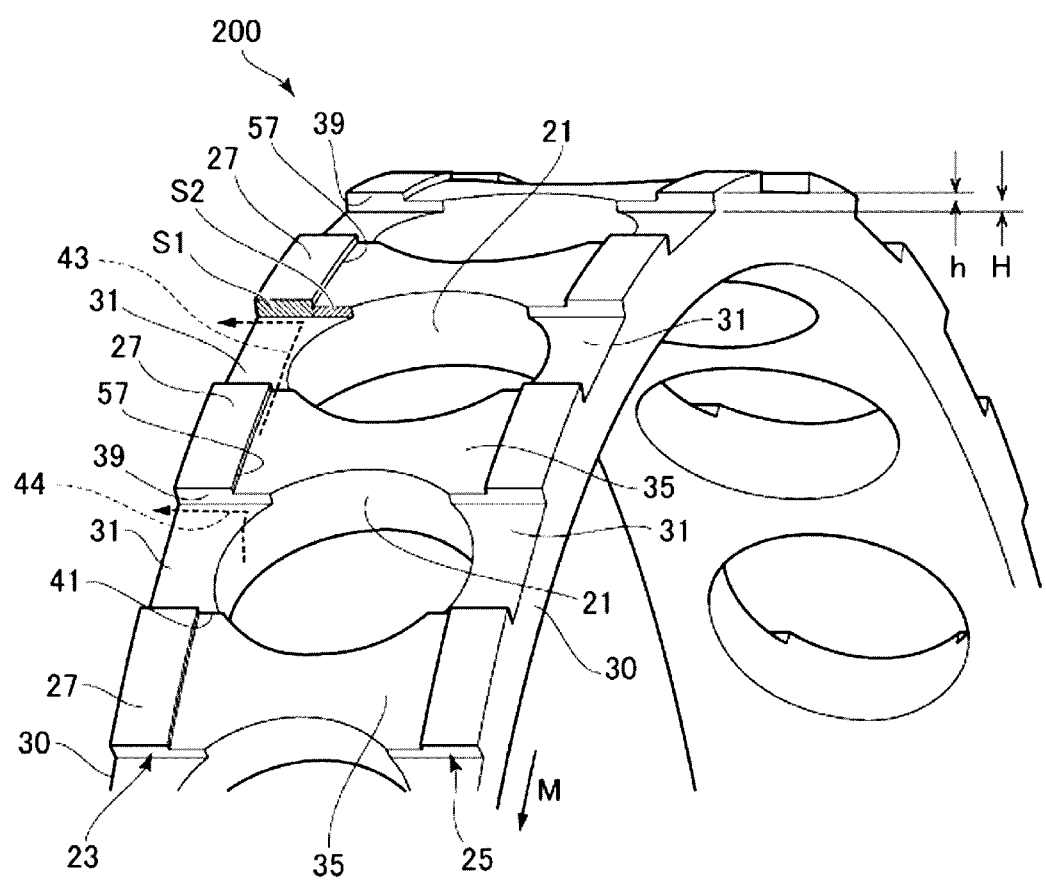
FIG. 5 is an enlarged perspective view of a retainer outer diameter surface of the retainer.

FIG. 5 is an enlarged perspective view of a retainer outer diameter surface of the retainer for the bearing.

The retainer 200 is formed with the axial groove 31 in the retainer outer diameter surface, which traverses the retainer guide surface 27 in the axial direction. The axial groove 31 is formed from the pocket 21 to an axial end surface 30. The axial groove 31 in this configuration traverses both the guided portion 23 and the guided portion 25. That is, axial grooves 31 formed respectively in the guided portions 23, 25 have the same phase in the circumferential direction, and groove bottoms thereof are on a radially inner side with respect to that of the edge relief groove 35. That is, the axial groove 31 is formed at a position lower than the edge relief groove 35.

As illustrated in FIG. 4B, when an outer diameter of the retainer guide surface 27 is D1, an outer diameter of the edge relief groove 35 is D2, and an outer diameter of the groove bottom of the axial groove 31 is D3, the retainer 200 satisfies:

$$D1>D2>D3>PCD \quad \text{(Expression 1).}$$

PCD is a ball pitch circle diameter.
More desirably, the retainer 200 satisfies:

$$D1\times0.999\geq D2 \quad \text{(Expression 2).}$$

With the retainer 200 satisfying the above expression (1), a step H occurs between the groove bottom of the axial groove 31 and that of the edge relief groove 35 illustrated in FIG. 5, and a step h occurs between the edge relief groove 35 and the retainer guide surface 27. Accordingly, the axial groove 31 is formed with an axial step portion 39 at both ends in the circumferential direction, which has a step H with respect to the edge relief groove 35 and a step (H+h) with respect to the retainer guide surface 27.

One end of the axial groove 31 near the axial center is connected to the pocket 21, and another end thereof on an opposite side in the axial direction is opened as a discharge opening. That is, the axial groove 31 functions as a discharge groove that discharges grease axially outside. A part of the axial groove 31 that corresponds to the step H overlaps the pocket 21 in the axial direction (left-right direction in FIG. 5). The pocket 21 is not in contact with the guided portion 23. Therefore, a grease inlet 41, through which grease enters the groove bottom of the axial groove 31 from the edge relief groove 35, is ensured between the ball 19 housed in the pocket 21 and an inner wall of the guided portion 23.

When the retainer 200 rotates in a direction of M in FIG. 5, grease can enter the grease inlet 41 in a direction indicated by an arrow 43. After entering the grease inlet 41, grease enters the axial groove 31 that is lower than the edge relief groove 35. In this configuration, a circumferential step portion 57 is formed since the edge relief groove 35 circumferentially traverses the retainer guide surface 27 at an axial end. The circumferential step portion 57 is disposed on an axial end side with respect to an axial position where the axial step portion 39 is connected to the pocket 21. Therefore, an opening of the grease inlet 41 is widened, and grease adhering to the edge relief groove 35 can enter the axial groove 31 more smoothly.

Further, with the retainer 200 satisfying the above expression (2), an appropriate gap is established between the ball 19 and the outer ring guide surface 29. In the retainer 200 of an outer ring guide type, an appropriate gap is established between the pocket 21 and the ball 19 and between the outer ring guide surface 29 and the retainer guide surface 27. The retainer 200 rotates at an inclination with respect to the outer ring 13 within a range of the gap in accordance with rotation of the bearing. Therefore, a depth of the edge relief groove 35 is desirably equal to or more than 0.1% of the outer diameter D1 of the retainer guide surface 27.

Further, the retainer 200 is desirably to satisfy (depth $H$ of axial groove)>(3×depth $h$ of edge relief groove)     (Expression 3).

With the retainer 200 satisfying Expression (3), a large area (S1+S2) of the axial step portion 39 extending from the pocket 21 to the bearing end surface side can be ensured. By ensuring the area (S1+S2) of the axial step portion 39 to be large, a force of extruding grease by the axial step portion 39 can be increased, and an effect of discharging grease can be enhanced. Further, since Expression (3) is satisfied, an area of S2 and a step of the axial step portion 39 are ensured. Accordingly, grease scraped radially outside from the gap part between the pocket 21 and the ball 19 can be scooped into the axial step portion 39 part when moving in the circumferential direction.

On the other hand, the retainer 200 is intended to hold the ball 19, and thus the axial groove 31 and the edge relief groove 35 need to be located outside the ball PCD for contact at a maximum diameter portion of the ball 19. When the axial groove 31 and the axial step portion 39 are located inside the ball PCD, the ball 19 may come into contact with the a corner of the retainer 200 and wear, or may run on the retainer 200.

Next, operation of the above configuration will be described.

Figure 6:
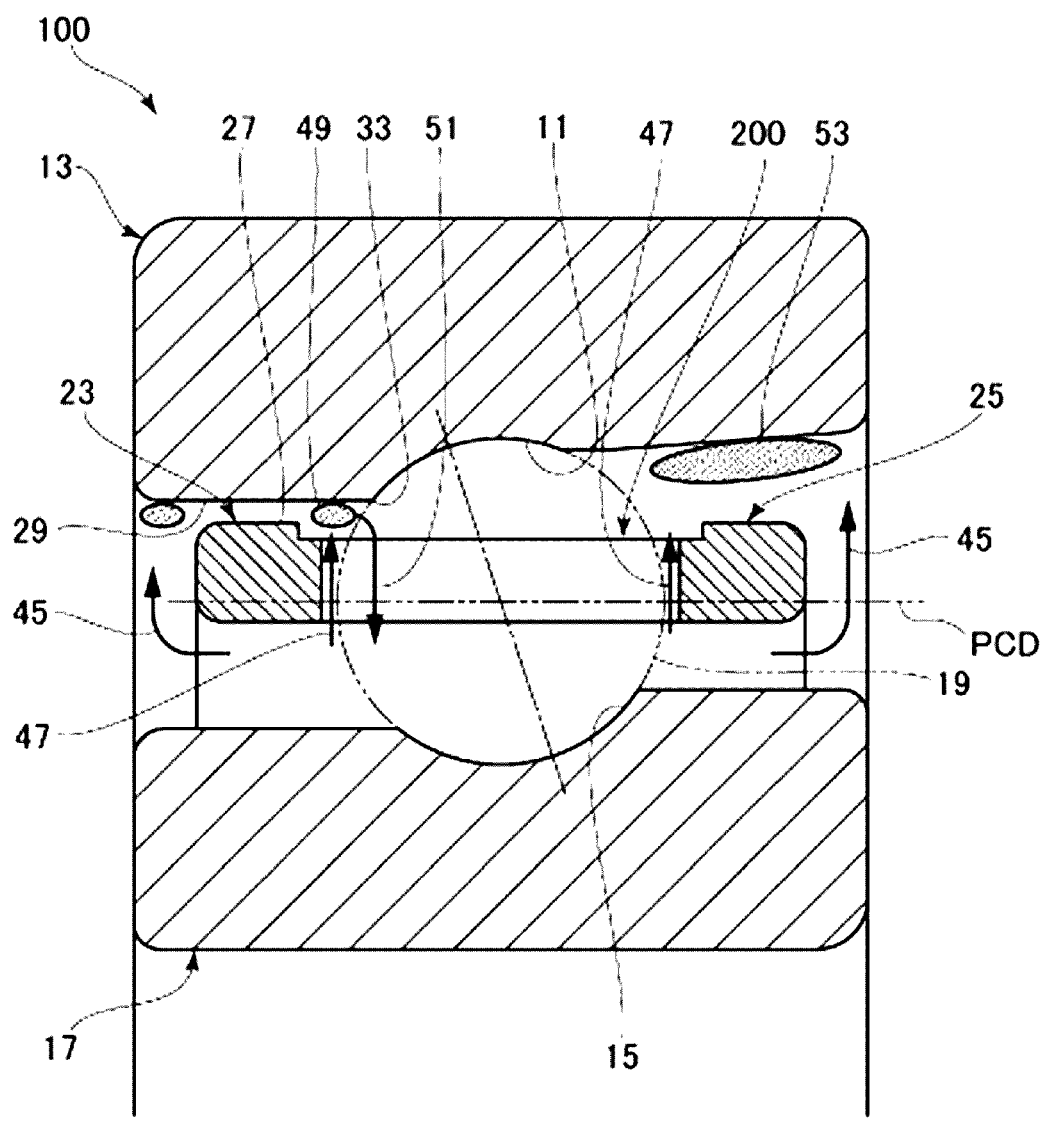
FIG. 6 is an operation illustrative view of a state of grease movement until grease adheres to an outer ring.

FIG. 6 is an operation illustrative view of a state of grease movement until grease adheres to the outer ring 13.

When the angular contact ball bearing 100 is used with grease lubrication, run-in operation is initially performed. The running-in operation ends with initially enclosing grease moves to a predetermined position where grease is discharged from an inside of the bearing.

During the running-in operation, as indicated by an arrow 45, grease in a retainer inner diameter portion is first discharged outside directly from an axial end of the retainer 200. Then, as indicated by an arrow 47, grease comes into contact with the ball 19 or moves to a retainer outer diameter side along a pocket inner diameter surface, and adheres to an outer ring inner diameter surface by a centrifugal force. Grease in the bearing moves about the ball 19, and hardly crosses a counterbore side or an anti-counterbore side.

Grease on the counterbore side remains in a stagnation position 53. On the other hand, grease on the anti-counterbore side adheres to a stagnation position 49. However, in a case of a structure in the related art, a force does not act to move grease in the stagnation position 49 axially outside, resulting in a repeated flow from the arrow 47 to an arrow 51.

Figure 7A:
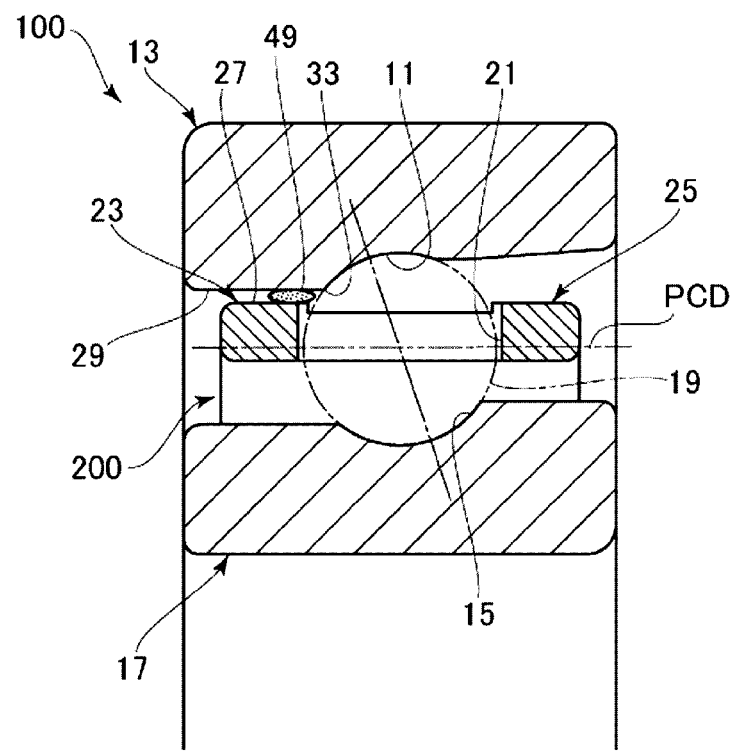
FIG. 7A illustrates operation until grease adhering to the outer ring is discharged axially outside, and is a cross-sectional view of a part of the rolling bearing.
Figure 7B:
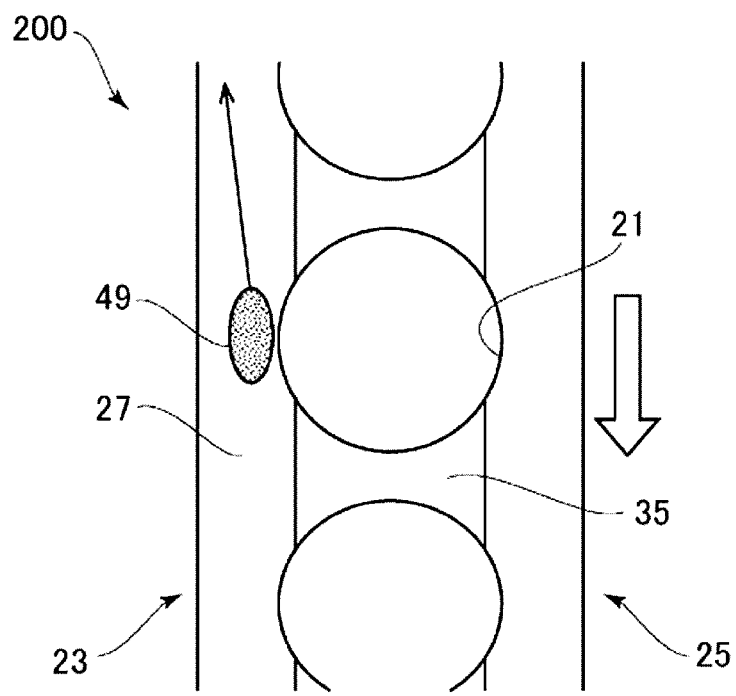
FIG. 7B illustrates operation until grease adhering to the outer ring is discharged axially outside, and is a front view of a main part of the retainer to which grease in contact with the outer ring adheres.

FIGS. 7A and 7B illustrate operation until grease adhering to the outer ring 13 is discharged axially outside. FIG. 7A is a cross-sectional view of a part of the rolling bearing, and FIG. 7B is a front view of a main part of the retainer to which grease in contact with the outer ring 13 adheres.

Here, in an opposing position of the outer ring guide surface 29 that is opposed to a part of the retainer 200 where the axial groove 31 does not exist, grease in the stagnation position 49 enters a narrow gap (guide gap) between the outer ring guide surface 29 and the retainer guide surface 27, and is discharged axially outside by shearing caused by relative movement between the retainer 200 and the outer ring 13, so as to be extruded from the guide gap.

On the other hand, in the axial groove 31 illustrated in FIG. 5, when the retainer 200 rotates in the direction of M, grease enters the axial groove 31, which is recessed with respect to the edge relief groove 35, from the grease inlet 41 after moving through the edge relief groove 35 in the circumferential direction, as is indicated by the arrow 43. Grease having entered the axial groove 31 is deposited on an upstream side in the rotation direction between the axial groove 31 and the axial step portion 39 (particularly, the area S1 part) to increase a grease thickness, and adheres to the opposing outer ring guide surface 29 (see FIG. 2). Accordingly, the deposited grease is pressed by the axial step portion 39, and moves axially outside while being sheared due to contact with the outer ring guide surface 29. Therefore, grease in the axial groove 31 is promoted to be discharged axially outside from an axial end portion on the outer ring guide surface 29 side that is opposed to the ball 19 located at a center in the axial direction.

Further, grease enters the axial groove 31 after moving radially outside from the pocket 21 of the retainer 200 in accordance with rotation of the ball 19, as is indicated by an arrow 44. Grease having entered the axial groove 31 is deposited on an upstream side in the rotation direction between the axial groove 31 and the axial step portion 39 (particularly, the area S2 part), and is pressed to the axial step portion 39. Accordingly, this grease flow merges with a grease flow indicated by the arrow 43 described above, and moves axially outside.

In this manner, in the angular contact ball bearing 100 with this configuration, a force acts to discharge grease to an axial end by grease adhesion to the axial step portion 39 of the axial groove 31 and grease adhesion to the outer ring guide surface 29, even when the edge relief groove 35 is formed in the retainer outer diameter surface. Therefore, grease moves to the axial end and is discharged smoothly. Accordingly, it is possible to reduce stirring resistance due to grease, and to prevent an increase in an amount of heat generation.

Even when the axial groove 31 exists in the retainer 200 and a depth thereof is substantially the same as that of the edge relief groove 35 (that is, H=0), grease discharged from the pocket 21 mainly moves in the circumferential direction due to the relative movement between the outer ring guide surface 29 and the retainer guide surface 27, and an extrusion force hardly acts due to the axial step portion 39. In this case, moved grease is not discharged axially outside from a guide surface side, but continues to circulate inside the bearing.

However, the retainer 200 in this configuration has the retainer guide surface 27, and is provided with the axial groove 31 between adjacent guided portions 23. Therefore, a discharge property of grease is promoted in combination with grease movement in the axial direction by pressing grease to the axial step portion 39 and grease shearing due to the relative movement between the axial groove 31 and the outer ring guide surface 29.

As for a shape of the retainer 200, the axial groove 31 reaches a position near the axial center from an axial end of the pocket 21. Accordingly, a large grease inlet 41 can be ensured, and an effect of discharging grease can be further promoted.

Therefore, according to the angular contact ball bearing 100 and the retainer 200 in this configuration, the discharge property of grease from the guide surface side and wear resistance of the retainer outer diameter surface can be improved, heat generation due to stirring resistance of grease can be reduced, and a decrease in bearing life can be prevented. Particularly, the above effect is remarkably obtained when a dmn value with grease lubrication is used at 800,000 (PCD (ball pitch circle diameter)×rotational speed) or more.

Second Configuration Example

Figure 8A:
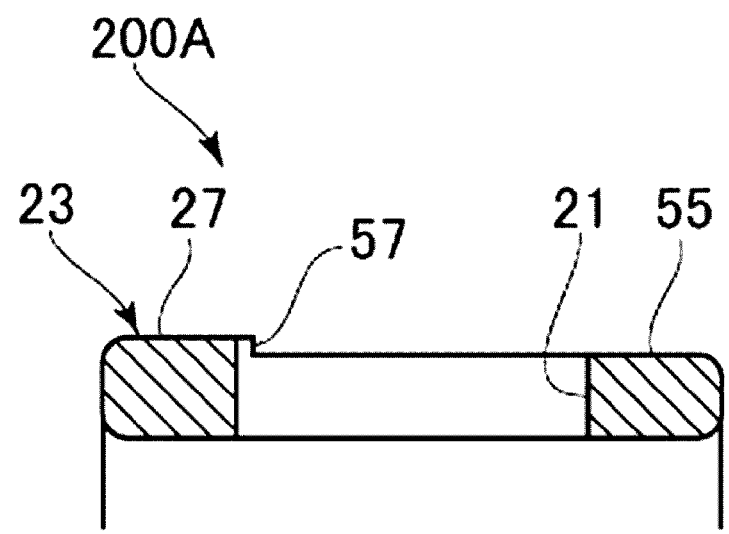
FIG. 8A is a cross-sectional view of a part of a retainer according to a second configuration example.
Figure 8B:
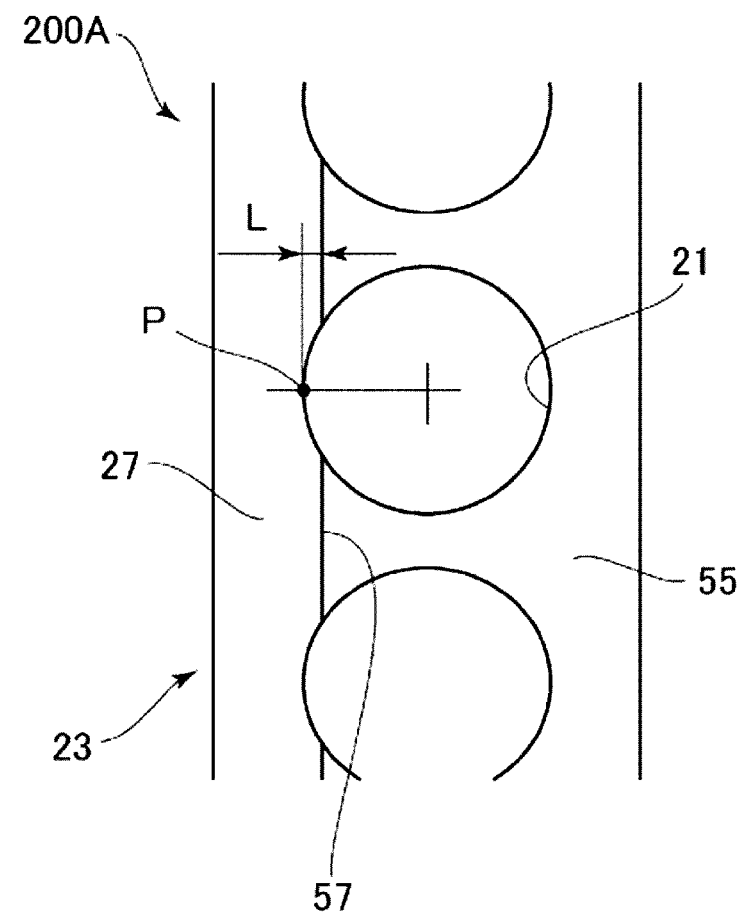
FIG. 8B is a front view of a main part of the retainer illustrated in FIG. 8A.

FIG. 8A is a cross-sectional view of a part of a retainer according to the second configuration example, and FIG. 8B is a front view of a main part of the retainer illustrated in FIG. 8A.

The retainer may be asymmetrical although the retainer 200 is bilaterally symmetrical with respect to the imaginary line 37 that bisects the edge relief groove 35. A retainer 200A in this configuration has the guided portion 23 protruding radially outward on only one axial end of a retainer outer diameter surface. An edge relief surface 55 having an outer diameter smaller than that of the retainer guide surface 27 is formed in the retainer outer diameter surface on a side opposite to the guided portion 23 in the axial direction. Therefore, the circumferential step portion 57 is formed between the retainer guide surface 27 and the edge relief surface 55. Other configurations of the retainer 200A are the same as those of the retainer 200 described above.

According to the retainer 200A in this configuration example, the retainer 200A can have a simple structure, and durability and productivity thereof can be increased together. An axial position of the circumferential step portion 57 of the edge relief surface 55 allows the circumferential step portion 57 to be located on an axial inner side with respect to a pocket end portion P on the retainer guide surface 27 side (L>0), as is illustrated in FIG. 8B. In this manner, an area of S2 (see FIG. 5) can be ensured large, and grease scraped out from a gap between a ball and the pocket 21 can be discharged axially outside more easily.

Third Configuration Example

Figure 9:
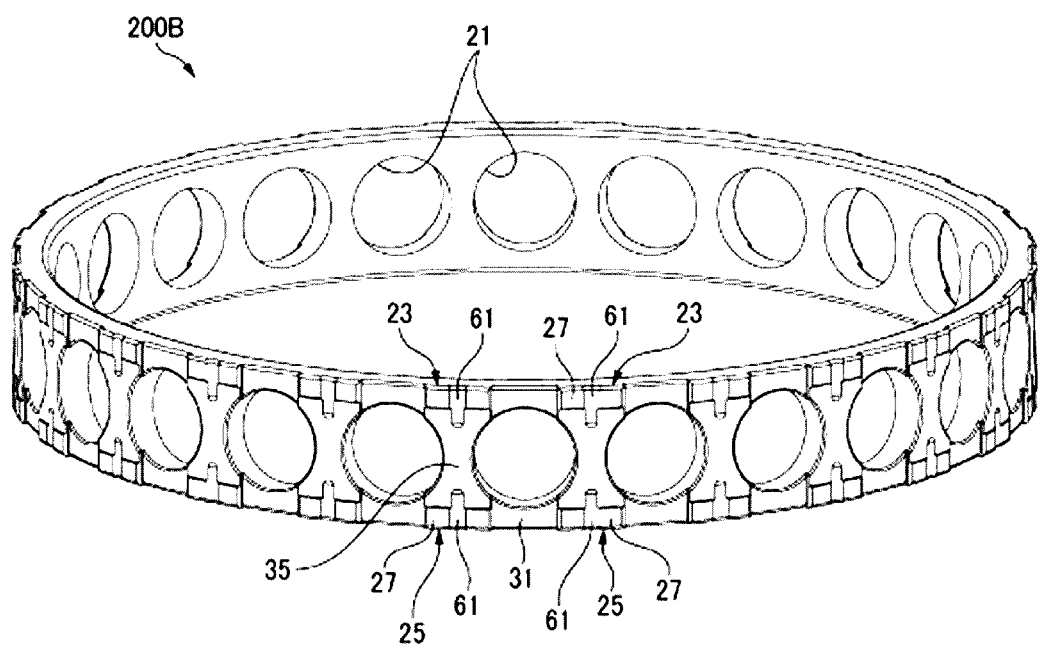
FIG. 9 is an external perspective view of a retainer according to a third configuration example.
Figure 10:
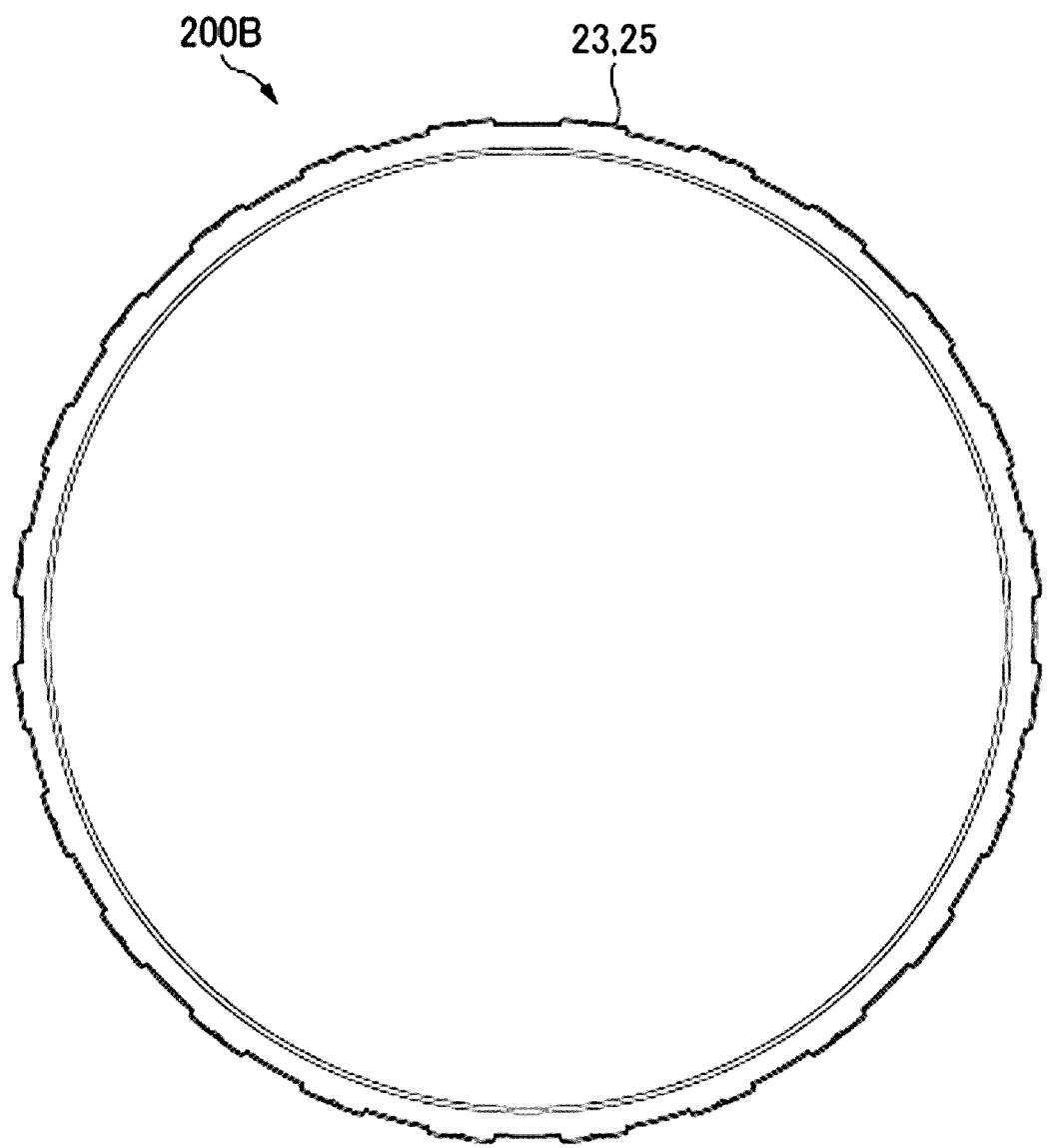
FIG. 10 is a side view of the retainer according to the third configuration example.
Figure 11:
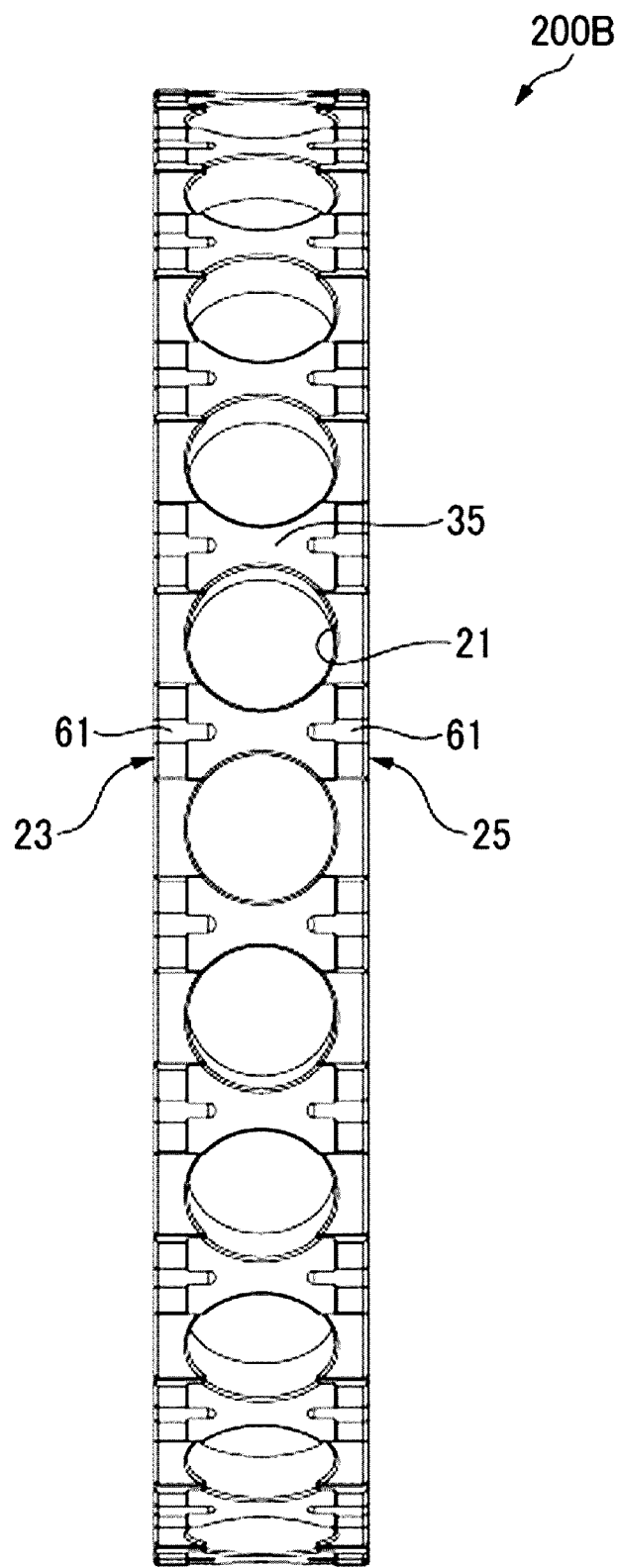
FIG. 11 is a front view of the retainer according to the third configuration example.

FIG. 9 is an external perspective view of a retainer 200B according to the third configuration example. FIG. 10 is a side view of the retainer 200B. FIG. 11 is a front view of the retainer 200B.

The retainer 200B in this configuration has the same configuration with the retainer 200, except that a recessed groove 61 is formed on the guided portions 23, 25 of the retainer 200 illustrated in FIG. 3 along an axial direction.

Figure 12:
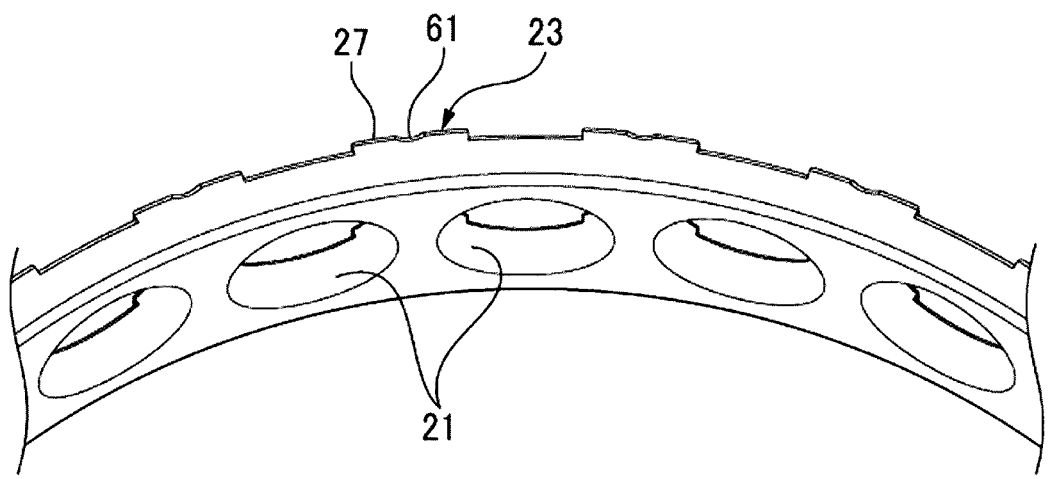
FIG. 12 is an enlarged view of an end surface portion of the retainer according to the third configuration example.
Figure 13:
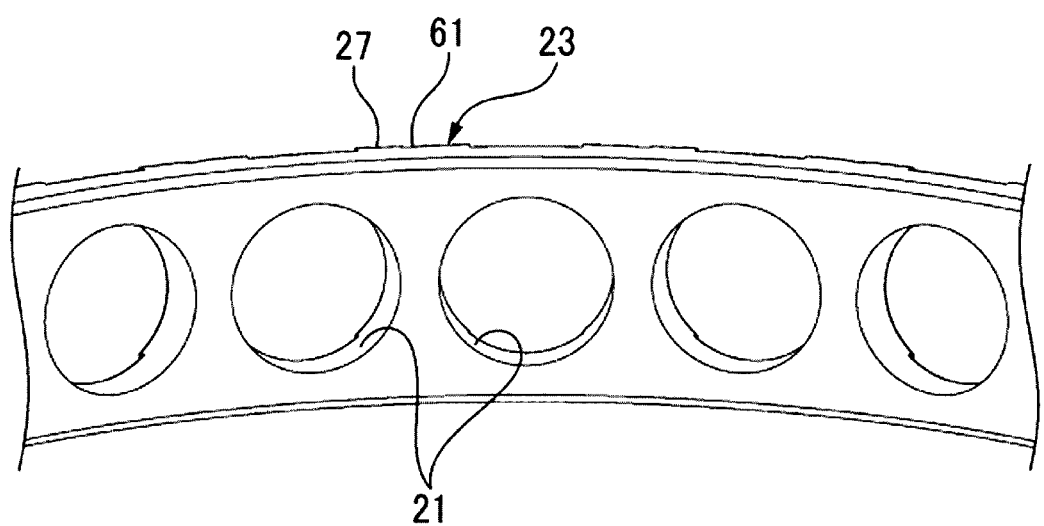
FIG. 13 is an enlarged view of a pocket of the retainer according to the third configuration example as viewed from an inner diameter side.
Figure 14:
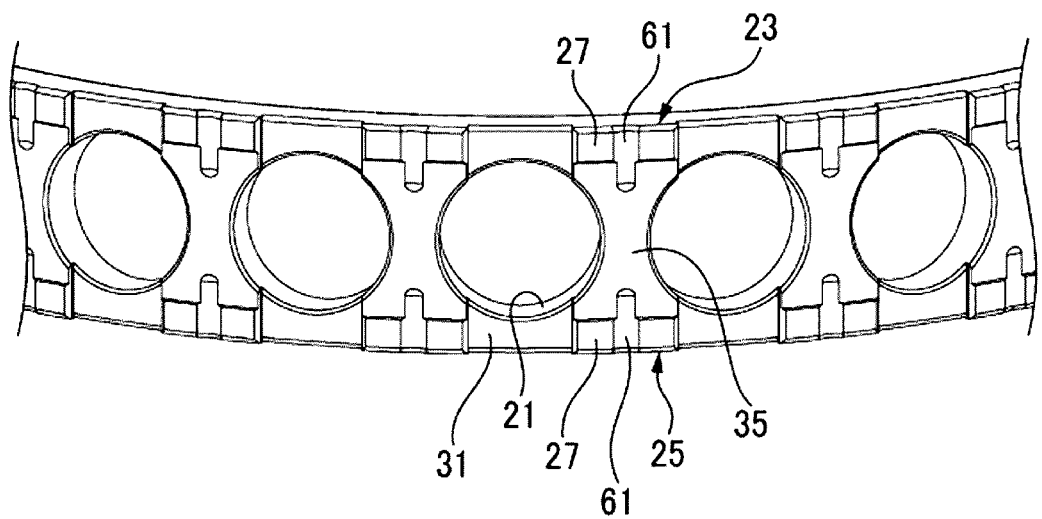
FIG. 14 is an enlarged view of a pocket of the retainer according to the third configuration example as viewed from an outer diameter side.

FIG. 12 is an enlarged view of an end surface portion of the retainer 200B, FIG. 13 is an enlarged view of the pocket 21 of the retainer 200B as viewed from an inner diameter side, and FIG. 14 is an enlarged view of the pocket 21 of the retainer 200B as viewed from an outer diameter side.

In the retainer 200B, the recessed groove 61 is formed in the retainer guide surface 27 of the guided portions 23, 25 and in a part of the edge relief groove 35. The recessed groove 61 has a depth deeper than that of the edge relief groove 35, and has an arc-shaped cross section in a circumferential direction. The recessed groove 61 penetrates the retainer guide surface 27 having a largest outer diameter in the axial direction until an intermediate part of the edge relief groove 35. Outer diameters of groove bottoms of recessed grooves 61 are equal on the retainer guide surface 27 side and the edge relief groove 35 side, and inner surfaces of the recessed grooves 61 on both sides are smoothly continuous. The recessed groove 61 may have a V-shaped cross section.

The recessed groove 61 of the guided portion 23 and the recessed groove 61 of the guided portion 25 are formed at a circumferential center of the retainer guide surface 27, and are in the same phase with respect to each other in the circumferential direction.

The recessed groove 61 disposed on a straight line in the axial direction can further promote an axially outward discharge property of grease. Further, the recessed groove 61 can be located at, for example, a parting line between molds when the retainer 200B is injection-molded. By providing the parting line in the recessed groove 61, even if a burr occurs in the parting line during molding, the burr would not protrude radially outside from the retainer guide surface 27 which has a maximum outer diameter of the retainer 200B. Accordingly, when the retainer 200B is assembled into a bearing, the burr would not be scraped or mix into grease.

Fourth Configuration Example

The retainer 200B in the third configuration example may have an asymmetrical shape as in the second configuration example.

Figure 15:
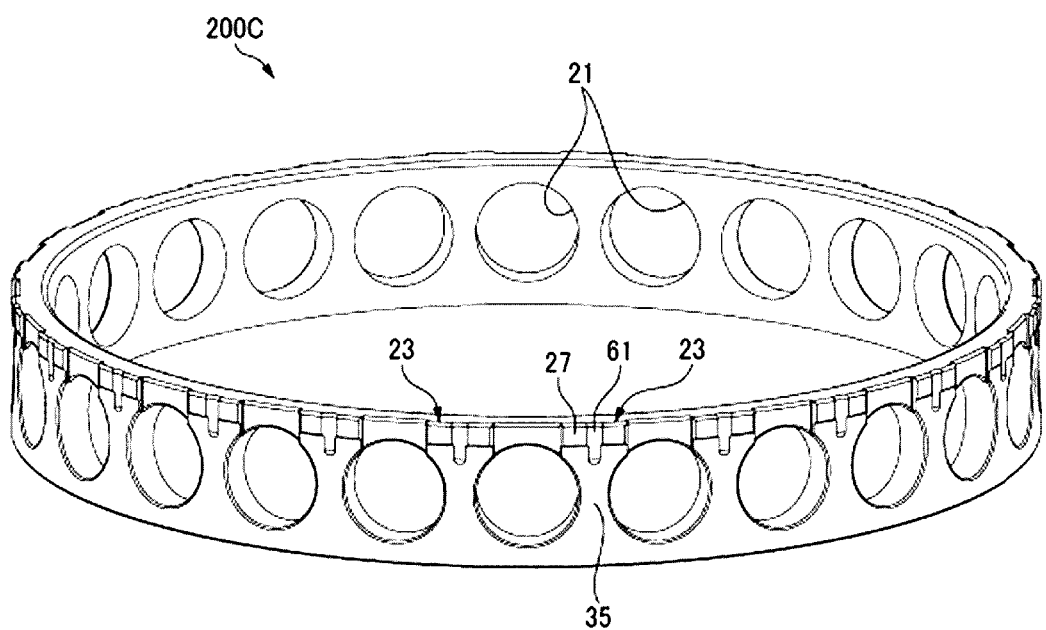
FIG. 15 is an external perspective view of a retainer according to a fourth configuration example.
Figure 16:
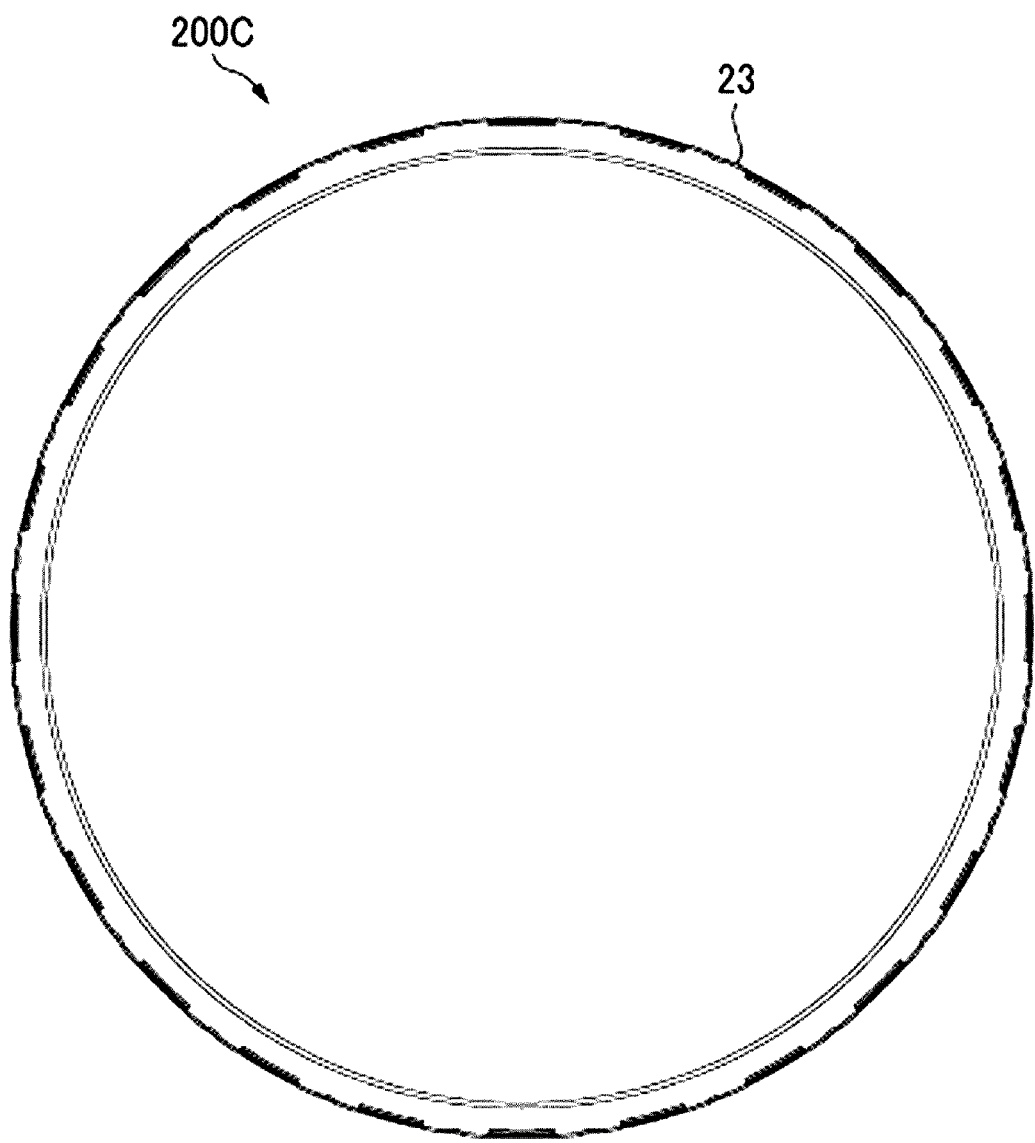
FIG. 16 is a front view of the retainer according to the fourth configuration example.
Figure 17:
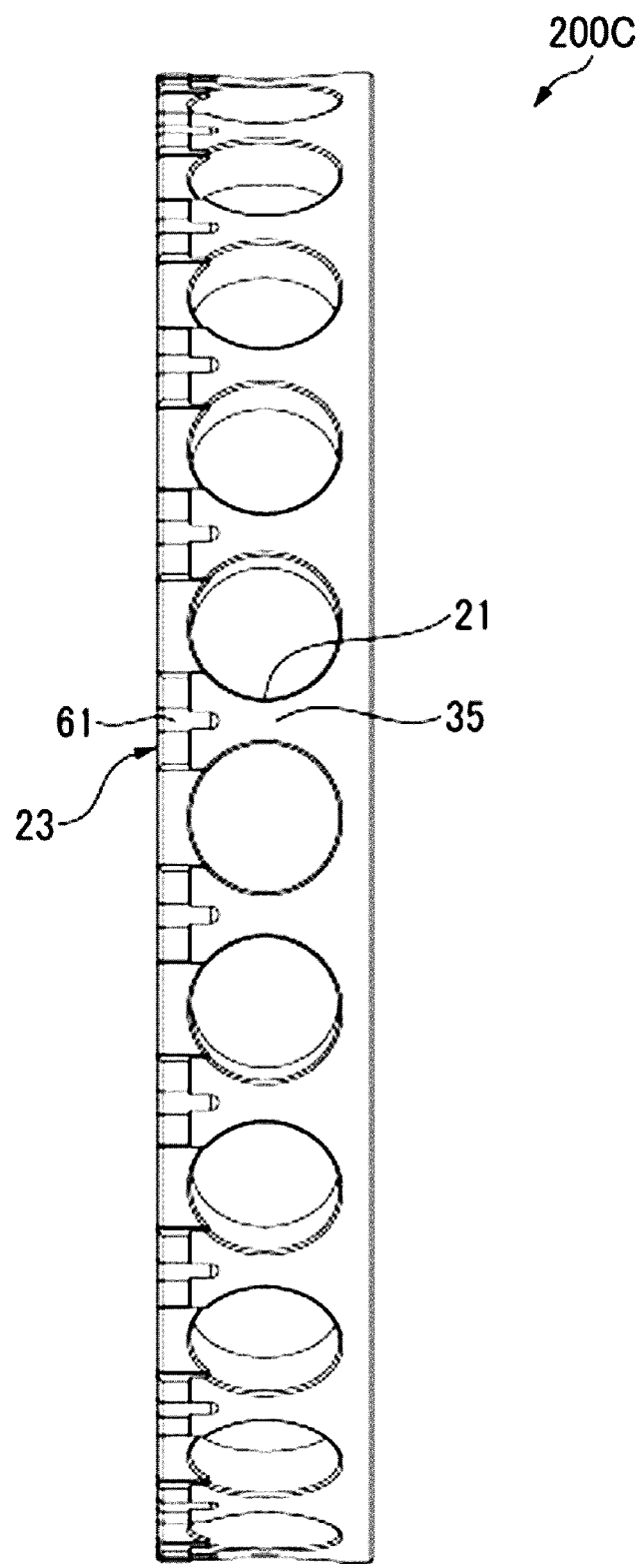
FIG. 17 is a side view of the retainer according to the fourth configuration example.
Figure 18:
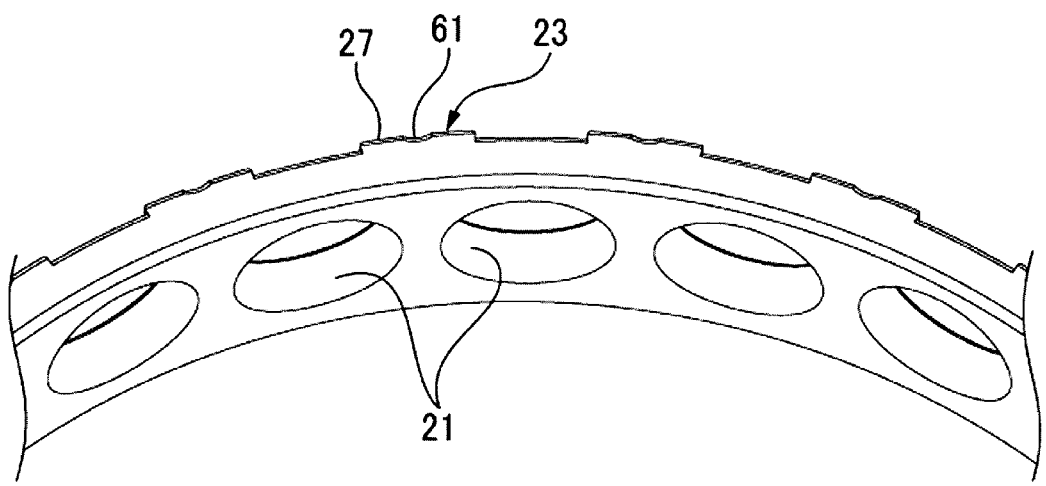
FIG. 18 is an enlarged view of an end surface portion of the retainer according to the fourth configuration example.
Figure 19:
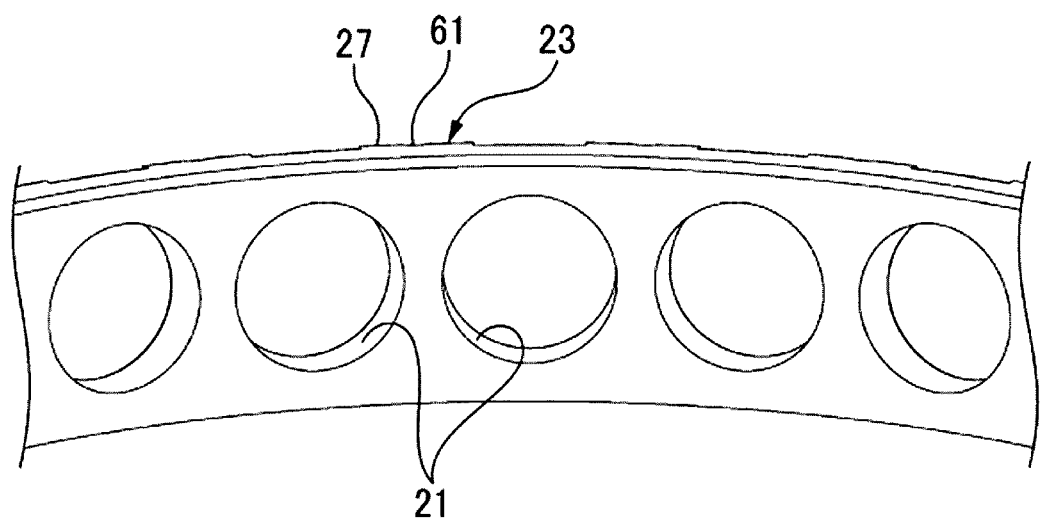
FIG. 19 is an enlarged view of a pocket of the retainer according to the fourth configuration example as viewed from an inner diameter side.
Figure 20:
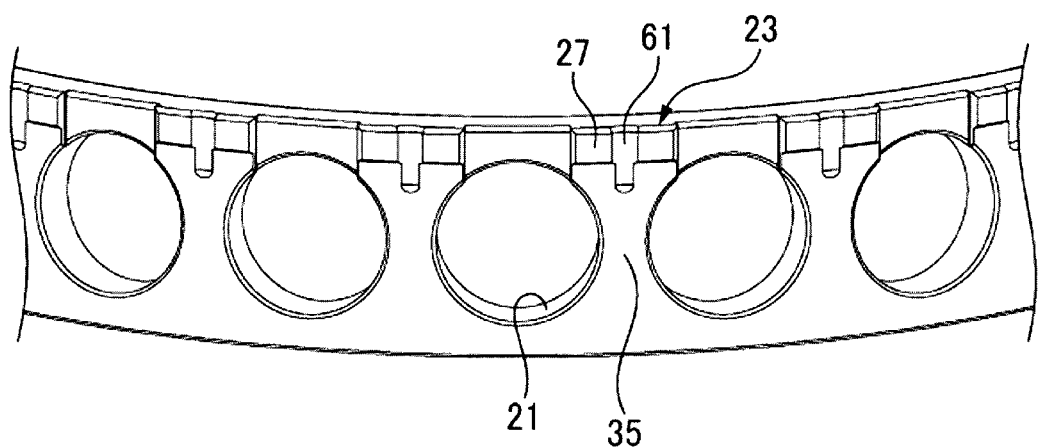
FIG. 20 is an enlarged view of a pocket of the retainer according to the fourth configuration example as viewed from an outer diameter side.

FIG. 15 is an external perspective view of a retainer 200C according to the fourth configuration example, FIG. 16 is a side view of the retainer 200C, and FIG. 17 is a front view of the retainer 200C. FIG. 18 is an enlarged view of an end face portion of the retainer 200C, FIG. 19 is an enlarged view of the pocket 21 of the retainer 200C as viewed from an inner diameter side, and FIG. 20 is an enlarged view of the pocket 21 of the retainer 200C as viewed from an outer diameter side.

The retainer 200C in this configuration has the guided portion 23 protruding radially outward on only one axial end of a retainer outer diameter surface. Other configurations of the retainer 200C are the same as those of the retainer 200B described above.

According to the retainer 200C in this configuration example, the retainer 200C can have a simple structure, durability and productivity thereof can be increased, and the same effect as that in the second configuration example can be obtained.

EXAMPLE

Figure 22:
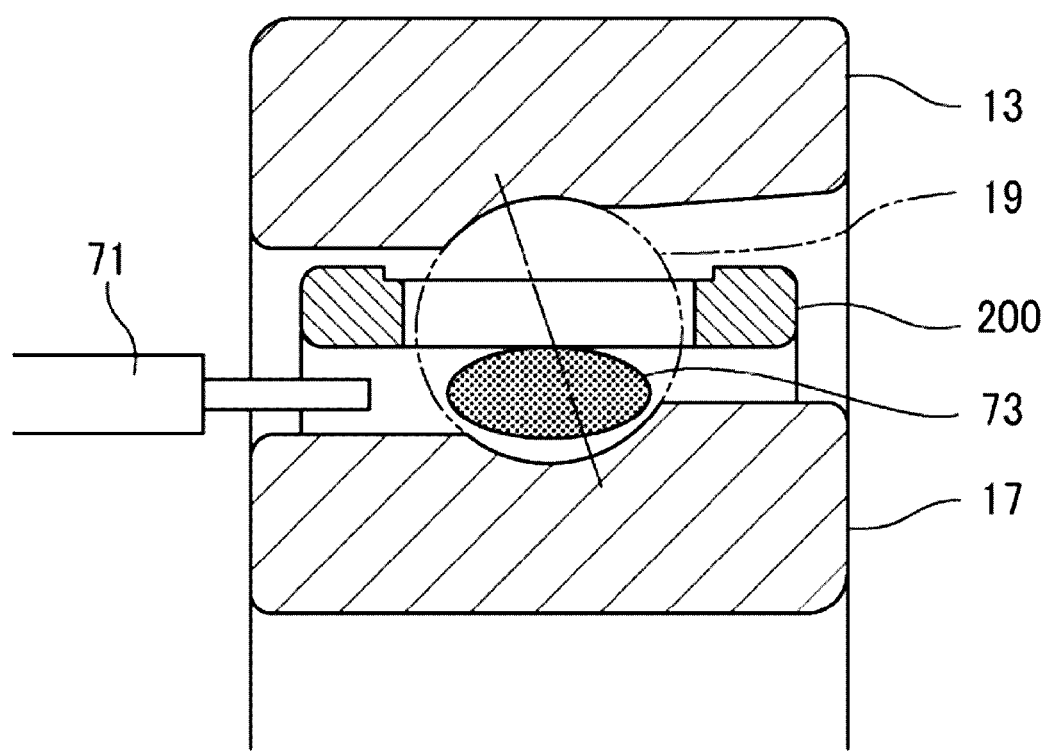
FIG. 22 is a cross-sectional view illustrating a grease enclosed state of a part of a bearing used in the test.
Figure 23:
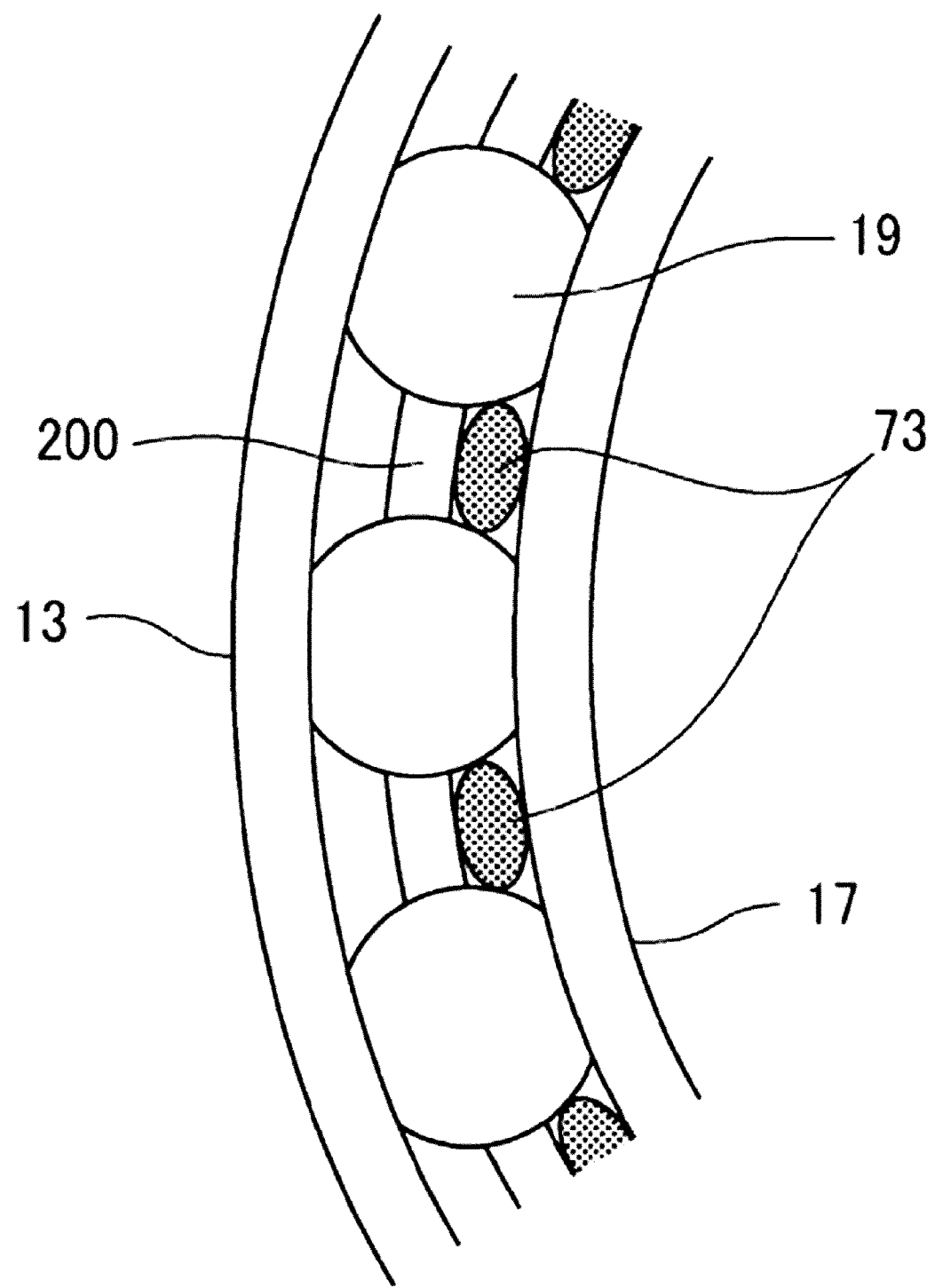
FIG. 23 is a side view illustrating the grease enclosed state of a part of a bearing used in the test.

In an angular ball bearing having an inner diameter of 70 mm (model number 70BNR10H, manufactured by Nippon Seiko Co., Ltd), 15% of space volume of the bearing was enclosed with grease (MTE grease, manufactured by Nippon Seiko Co., Ltd.), and the bearing was rotated at 4000 min$^{-1}$ for 2 minutes. Thereafter, the bearing was disassembled, so that adhesion of grease to a retainer was observed to confirm a discharge property of grease. Retainers used in a test and test results thereof are collectively shown in FIG. 21. An enclosing state of grease before the test is illustrated in FIGS. 22 and 23. FIG. 22 is a cross-sectional view of a part of the bearing used in the test, and FIG. 23 is a side view of a part of the bearing illustrated in FIG. 22. Before the test, grease 73 is discharged from a syringe 71 whose tip end faces a place between an outer peripheral surface of the inner ring 17 and an inner peripheral surface of the retainer 200. Grease 73 is supplied respectively between balls 19 along a circumferential direction of the bearing, and only an inner diameter side of the retainer 200 is enclosed.

A retainer in Comparative Example 1 is provided with only an axial groove having a depth of 0.5 mm without an edge relief groove.

A retainer in Example 1 has an edge relief groove at an outer diameter portion along a circumferential direction and an axial groove along an axial direction, and a width of the edge relief groove is equal to a pocket diameter. The axial groove has a depth larger than that of the edge relief groove. The axial groove of the retainer is divided into two parts across a radial through pocket which are opened at a retainer end portion. The axial groove overlaps the pocket along the axial direction, and axial end portions of the overlapping pocket serve as inner end portions of the spaced axial groove.

A retainer in Comparative Example 2 has an edge relief groove deeper than that of the retainer in Example 1, and an axial groove having the same depth as that in Example 1.

A retainer in Comparative Example 3 has an edge relief groove having an axial width larger than that in Comparative Example 2, and a pocket diameter larger than that in Example 1.

A material of these retainers is carbon fiber reinforced polyphenylene sulfide (PPS-CF).

In the retainer in Comparative Example 1, grease discharged from a pocket on an outer ring guide surface side moved in the circumferential direction by relative movement between the outer ring guide surface and a retainer guide surface, and was discharged by being pressed against an axial step portion of the axial groove continuous from the pocket and moving in the axial direction. However, wear may occur from an edge position of a raceway surface that is a start point, since the retainer was in contact with a raceway surface edge of an outer ring.

In the retainer in Example 1, grease discharged from a pocket and grease on an outer ring guide surface side moved in the circumferential direction by relative movement between the outer ring guide surface and a retainer guide surface. The circumferentially moving grease was discharged from an inside of the bearing by being pressed against an axial step portion of the axial groove connected with the edge relief groove and moving in the axial direction. In this shape, the axial groove extends along a periphery of a pocket from an axial end portion of the pocket to a position near an axial center of the retainer. Therefore, a cross-sectional area of a flow passage that connects the edge relief groove and the axial groove increased, so that grease entered the axial groove smoothly. Further, the axial groove reached a position closer to a retainer center than an outer ring raceway surface edge, thereby enhancing an effect of discharging grease adhering to the edge relief groove to the axial groove. This configuration is considered to have sufficient wear resistance, since there is no contact between edge portions, grease reaches a guide surface, and a lubrication state is also good.

In the retainer in Comparative Example 2, a width of the edge relief groove is equal to a pocket diameter, and there is a circumferential break at an axial end portion of the edge relief groove at a position where an end of a pocket is projected in the circumferential direction. Therefore, grease discharged from the pocket adhered to a retainer guide surface side, and only a small portion thereof spread to the retainer guide surface and was discharged while most thereof circulated inside the bearing. Therefore, in this shape, a discharge property of grease was lower as compared with Example 1. It can be considered that a lubrication failure and wear of the guide surface occur since little grease adheres to the guide surface and a portion where no grease adheres can also be seen.

Further, excessive grease remains inside the bearing, and accordingly heat generation due to stirring resistance is generated, and a premature damage may occur in the bearing.

In the retainer in Comparative Example 3, grease discharged from a pocket on a retainer guide surface side moved in the circumferential direction by relative movement between an outer ring guide surface and the retainer guide surface. However, no force acts to press grease axially outside and grease moved in the circumferential direction came into contact with a rolling element again. Therefore, grease was not discharged outside in the axial direction from the retainer guide surface side. Further, wear resistance of a retainer outer diameter surface by a raceway surface edge was lower than that in Comparative Example 2 due to a lubrication failure of grease.

Retainers in Example 1 and Comparative Examples 1 to 3 were bilaterally symmetrical with respect to the axial direction, but the same result was also obtained in a retainer having an asymmetrical step as illustrated in FIG. 8.

A mark ○ shown in FIG. 21 represents a level of a good product and a mark x represents a level at which no problem occurs under normal use conditions but may result in a defective product when the use conditions are severe, and a mark Δ represents a level at which a product that is not a good one can be applied depending on a use state.

The present invention is not limited to the above-mentioned embodiment, and modifications and applications made by one skilled in the art based on a combination of configurations in the embodiment, description in the specification, and well-known art, are plans of the present invention and thus fall within the scope of protection.

For example, the rolling bearing is not limited to an angular contact ball bearing, and may be another type of rolling bearing such as a cylindrical roller bearing. This effect can be expected not only with grease lubrication but also with oil air lubrication, jet lubrication, or the like.

This application is based on Japanese Patent Application (JP-A-2016-216734) filed on Nov. 4, 2016 and Japanese Patent Application (JP-A-2017-92524) filed on May 8, 2017, contents of which are incorporated herein by reference.

DESCRIPTION OF REFERENCE NUMERALS 13 outer ring
17 inner ring
19 ball (rolling element)
21 pocket 27 retainer guide surface
31 axial groove
35 edge relief groove (Relief surface)
100 angular contact ball bearing
200, 200A, 200B, 200C retainer

The invention claimed is:

1. A retainer of an outer ring guide type, applied to a rolling bearing including an inner ring, an outer ring, and a plurality of rolling elements disposed between the outer ring and the inner ring, and has a plurality of pockets in which the rolling elements are held, the retainer comprising:
- a retainer guide surface that is provided on at least one axial end portion of a retainer outer diameter surface of the retainer and is guided by the outer ring;
- a relief surface that is formed on the retainer outer diameter surface along a circumferential direction, located on an axial center side with respect to the retainer guide surface, and has an outer diameter smaller than that of the retainer guide surface; and
- an axial groove that extends from the pockets to an axial end on the retainer outer diameter surface, forms an axial step portion by axially traversing the retainer guide surface, and has a groove bottom located radially inward relative to the relief surface.

2. The retainer according to claim 1, wherein a circumferential step portion formed by the relief surface by circumferentially traversing the retainer guide surface is disposed on the one axial end portion side with respect to an axial position at which the axial step portion is connected to the pockets.

3. The retainer according to claim 2, wherein the circumferential step portion is disposed on an axial center side with respect to a pocket end portion of the pockets on the one axial end portion side.

4. The retainer according to claim 1, wherein when an outer diameter of the retainer guide surface is D1, and an outer diameter of the relief surface is D2, the retainer satisfies:

D1 X 0.999≥D2.

5. The retainer according to claim 1, wherein the retainer guide surface is provided on the one axial end portion and another axial end portion that is opposite to the one axial end portion.

6. A rolling bearing comprising the retainer according to claim 1.

7. The rolling bearing according to claim 6, which is an angular contact ball bearing.

* * * * *